Oct. 27, 1931.   L. KIRSCHBRAUN ET AL   1,829,722
PROCESS OF MAKING AQUEOUS BITUMINOUS EMULSIONS
Original Filed Dec. 8, 1919   7 Sheets-Sheet 5

Patented Oct. 27, 1931

1,829,722

UNITED STATES PATENT OFFICE

LESTER KIRSCHBRAUN, OF LEONIA, AND FREDERICK C. OVERBURY, OF HILLSDALE, NEW JERSEY; SAID OVERBURY ASSIGNOR OF HIS ENTIRE RIGHT TO THE FLINT­KOTE COMPANY, OF BOSTON, MASSACHUSETTS, A CORPORATION OF MASSACHU­SETTS

PROCESS OF MAKING AQUEOUS BITUMINOUS EMULSIONS

Application filed December 8, 1919, Serial No. 343,392. Renewed August 25, 1923.

This invention has for its object broadly to provide a method of and apparatus for continuously producing an aqueous non-ad­hesive homogeneous bituminous or hydro­carbon size or emulsion for use in the arts, such for example for use in the manufacture of fibrous waterproof roofing materials, or for various other purposes.

The size or emulsion comprises water, a hydrocarbon or bitumen of the nature of tar, pitch, or asphalt or any equivalents which are adhesive or sticky at or above ordinary temperatures, and a suitable colloid, e. g. clay or its equivalent, which is capable of minute subdivision. If these three ingredi­ents are brought together in such way that minute globules of hydrocarbon and the col­loid constitute the internal or disperse phase and the water constitutes the external or continuous phase of the emulsion, an end product results which is non-adhesive, and which may be thinned with water and mixed with cellulose fiber and other materials in an ordinary beater engine without forming a coherent mass, and flowed onto a Fourdrinier wire or other support to form a web. When such a web is subjected to heat or pressure or both, the water is eliminated or expressed and the contacting hydrocarbon or bitumin­ous particles coalesce to form a sheet possess­ing many of the characteristics of saturated roofing felt. It has heretofore been proposed to mix the water, hydrocarbon and colloidal material, in preparing the size, in batches, but in practice, this procedure has produced, at times, variable results; and, as initially stated herein, it is the primary object of our invention, to provide, not only a process of feeding, mixing and emulsifying the ingre­dients continuously so as to permit the con­tinuous withdrawal of the finished product, but also one which enables the production of a product of predetermined standard.

In general, the process is carried out by first forming an aqueous colloidal suspen­sion, e. g. a mixture of finely divided clay (containing a high percentage of colloids) or other equivalent colloid and water, in pre­determined proportions, and then mixing such suspension with the hydrocarbon or bitumen, the suspension and the hydrocar­bon being fed to the emulsionizer or mixer in predetermined proportions. Under proper conditions to be described, the hydrocarbon is emulsified by the aid of the emulsifying agent and is formed into minute discrete globules or particles which do not coalesce or adhere, but which, when heated or sub­jected to sufficient pressure to express the water, form an agglomerated coalescent or coherent mass. The mixing should be thor­ough, and, so far as we are aware, should take place in the presence of a portion of the previously formed end product. That is to say, the end product, the aqueous colloidal suspension and the hydrocarbon should all be present and mixed together to ensure standard results. Preferably the hydrocar­bon, or bitumen, e. g. asphalt, is heated to a relatively high temperature before being fed to the mixing tank, so that, when it is brought into the presence of the water of the suspension, the asphalt is formed into minute particles, and the asphalt, the sus­pension and a portion of the end product are thoroughly mixed. For the purpose of dis­tinguishing this end product which is thus mixed with the other ingredients from that which is drawn from the mixing tank, we refer to it as the virgin material or product.

In actual practice, constant streams of the virgin material, the aqueous colloidal suspen­sion and the hot hydrocarbon or bitumen are churned together by agitators operating at high speed, a portion of the product being delivered constantly from the apparatus and the remainder being circulated through the mixer as virgin material. Provision is made for accurately feeding predetermined pro­portions of the hydrocarbon and the suspen­sion to the mixer and for withdrawing a cor­responding amount of finished product; but, in order to provide for a constant supply of virgin product to the mixer, a dominant pool thereof is established, into which the product is delivered from the mixer, from which a portion is circulated back to the mixer, and from which the end product is continuously withdrawn. This pool is kept in agitation as will be explained more in detail.

The apparatus, which is illustrated upon the accompanying drawings for carrying out our process, comprises an instrumentality for making the said suspension, instrumentalities for feeding predetermined proportions of the suspension and the hydrocarbon, a tank for containing the dominant pool, and a mixer therein through which the virgin material in the tank is circulated and to which the suspension and the hydrocarbon are supplied.

Referring to said drawings,—

Figure 1 represents a front elevation of the apparatus referred to.

It will be understood that any suitable instrumentalities may be employed for carrying out the process as hereinafter claimed. Referring to the apparatus as illustrated, it comprises two parts, one including the mixer or emulsionizer and means for circulating a portion of the pool of virgin product through the mixer, and the other including the instrumentalities for feeding the liquid hydrocarbon and the aqueous colloidal suspension to the mixer or emulsionizer.

The mixer or emulsionizer and its adjacent instrumentalities will first be described, reference being had more to Figures 6 to 11 inclusive, and more particularly to Figure 8.

A cylindrical tank or container is indicated at 20 which contains the pool of virgin emulsified product, and which is provided with a closed lower end or head 21 and an open upper end. A port 22 in the side of the tank communicates with an eduction pipe 23 provided with a valve 24 for regulating the flow of the finished product therethrough. The tank is provided in its bottom with one or more cleanout apertures 25 normally closed by screw plugs 26. Located concentrically within the tank is a stationary upright open end tube or cylinder 27 (forming a chamber) which is considerably less both in length and diameter than the tank or container 20, and which is secured in place by radiating spokes 28, of which there may be any suitable number. For convenience, the reduced inner ends 29 of the spokes may be screwed into complemental threaded apertures in the cylinder 27, and lag screws 30 may be employed to secure the outer ends thereof to the wall of the tank 20. Arranged axially in the cylinder 27 is an agitator shaft 31 mounted so as to be capable of high speed rotation, and having fast thereon a series of propellers 32. Each propeller has a hub keyed on the shaft and fastened against axial movement, and radiating helicoidal blades of relatively sharp pitch extending close to the inner wall of the cylinder. As shown, there are three of these agitators or propellers, and they are arranged on the shaft in the non-registering relation shown in Figure 11. Between the propellers, the cylinder may if desired be provided with two rings 33, each having inwardly projecting blades 34 which are radially disposed but which are opposite in pitch to the propeller or agitator blades. At 35 there is a frusto-conical hood or deflector which has hooked straps 36 which are engaged with the upper edge of the tank 20, and which are detachably secured thereto by setscrews 37. This hood is of such diameter at its base that it can be slid into the upper end of the tank as shown. If desired this hood may be replaced by a closed top or head. At 38 there is shown a pipe or conduit for supplying asphalt or other equivalent hydrocarbon to the apparatus, and at 39 is a pipe or conduit for supplying the aqueous colloidal suspension thereto. Fast on the lower end of the shaft, below the lower end of the cylinder, there is a hub or disk 40 having a plurality of radiating flat blades, the function of which is to stir the material contained in the tank and to cause it to flow upwardly through the annular space between the cylinder and the wall of the tank, and overflow back or circulate through the cylinder, as will be explained more at length hereinafter. It may be remarked in passing that these blades are formed with cylindrical shanks arranged in sockets in the hubs and are thus capable of rotative adjustment to vary the pitch of the flat portions of the blade, and thus increase or decrease the lifting action of the blades on the material in the tank. The manner in which the shaft 31 is journaled and stepped and the mechanism for effecting its rotation at high speed,—say 600 R. P. M.,—will subsequently be described.

Assuming that the tank has a full charge of the previously prepared size or emulsion, that the shaft is undergoing rotation, and that the asphalt or equivalent hydrocarbon at a temperature of say 325° to 400° F. and the aqueous suspension at seasonable temperatures or at an elevated temperature are being fed at the proper rate of flow and in proper proportion to the cylinder, the following action takes place. The virgin material is swirled and agitated and forced to flow spirally upwardly through the space between the container and the enclosed cylinder, and to overflow back in a swirling stream into the top of the cylinder substantially as indicated by the dotted lines in Figure 8. The asphalt at a higher temperature is delivered into contact with the aqueous suspension (delivered through the pipe 39) and also into contact with the virgin product. The rapid rotation of the agitator blades agitates the mixture and throws it centrifugally outwardly in a swirling mass toward the wall of the cylinder and also downwardly in vortex formation, (this mass being broken up, intermixed and intermingled by contact with the baffle blades 34, if the latter are present). The result is that, before leaving the cylinder under impulsion of the lower propeller or agitator, the whole mass is thoroughly churned into a homogeneous emulsion. The resultant product is one in which the minute globules of asphalt and noncolloidal material are dispersed in discrete nonadhesive particles in the water.

Figure 2:
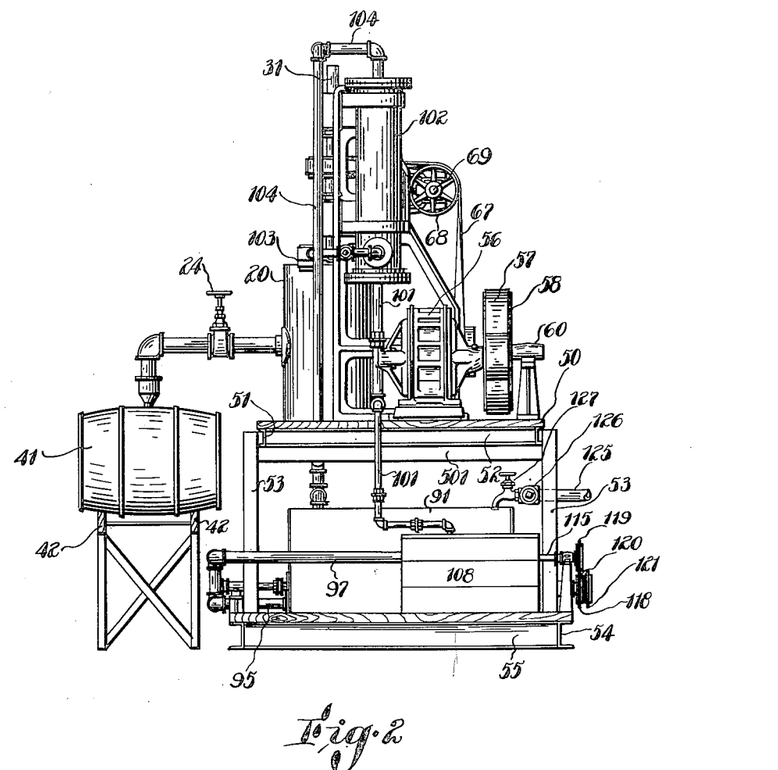
Figure 2 represents an end elevation of the same.
Figure 3:
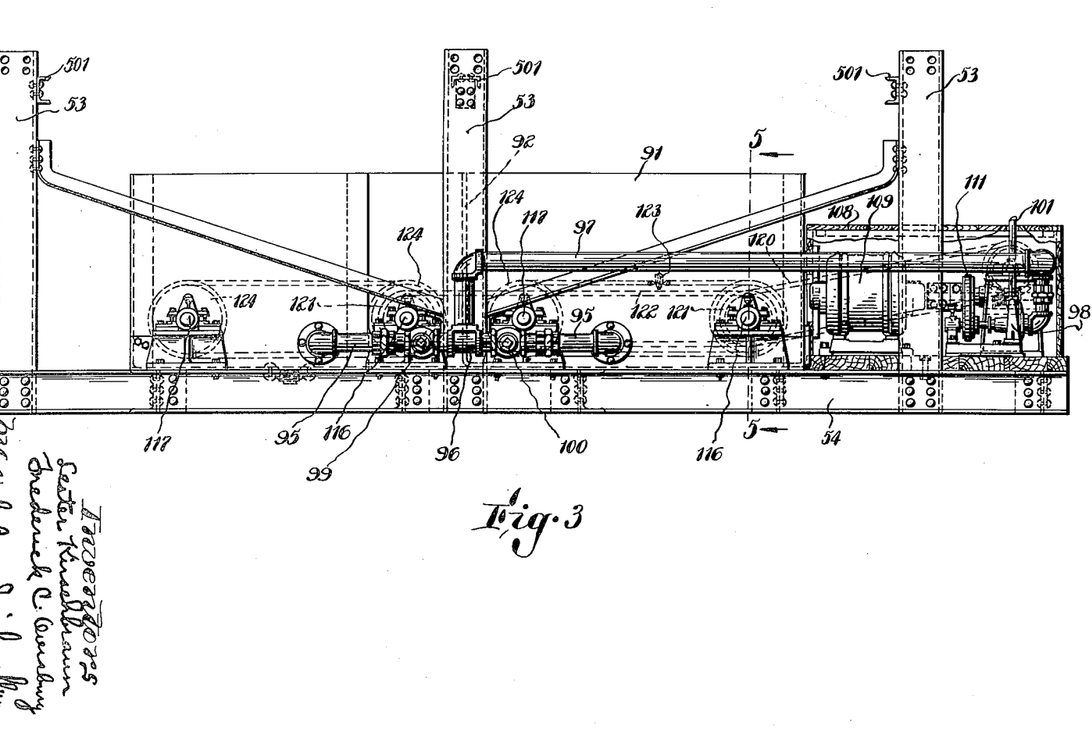
Figure 3 represents on a larger scale the lower portion of the apparatus comprising the tanks in which the suspension is prepared, the pumps, etc.
Figure 4:
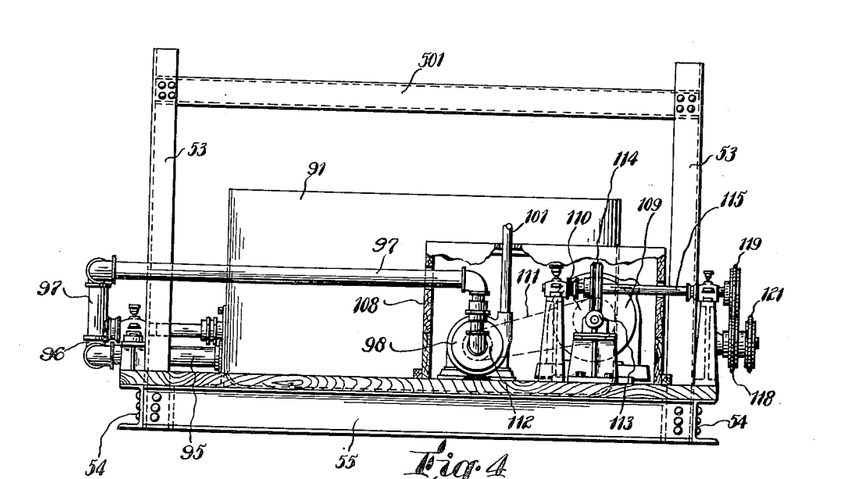
Figure 4 represents in end elevation the portion of the apparatus shown in Figure 3.
Figure 5:
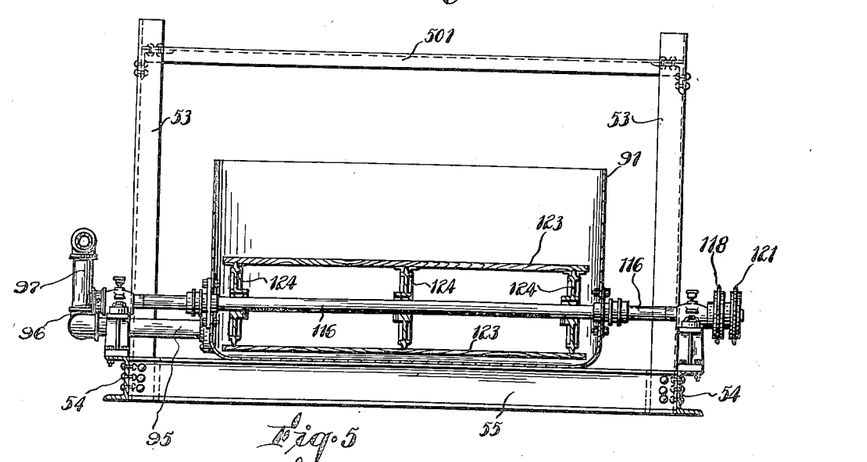
Figure 5 represents a section through one of the suspension tanks, on the line 5—5 of Figure 3.

It is our theory that highly heated asphalt, on coming into contact with the water, foams, because of the formation of steam, and the foaming mass is forced downwardly through the mixer cylinder, there being a distinct vortex axially within the cylinder. A small portion of the end product flows constantly through the eduction pipe 23, the outflow being in volume equal to the inflow of the asphalt and the colloidal suspension. There is, however, a continuous circulation of the virgin product of the pool in the container, upwardly past the exterior of the mixer cylinder, and downwardly through the latter, without the formation of a cohesive or sticky mass. By regulating the inflow of asphalt, or colloidal suspension, the end product will be more or less viscous (or thicker or thinner) as the case may be. The valved eduction or delivery conduit 23 is shown, in Figure 2, as discharging the final product into a barrel 41. The barrels may be rolled down inclined skids 42 suitably supported and braced, so as to be brought successively into receiving position. If desired, however, the end product may be delivered through conduits to any other suitable receptacles.

Figure 1:
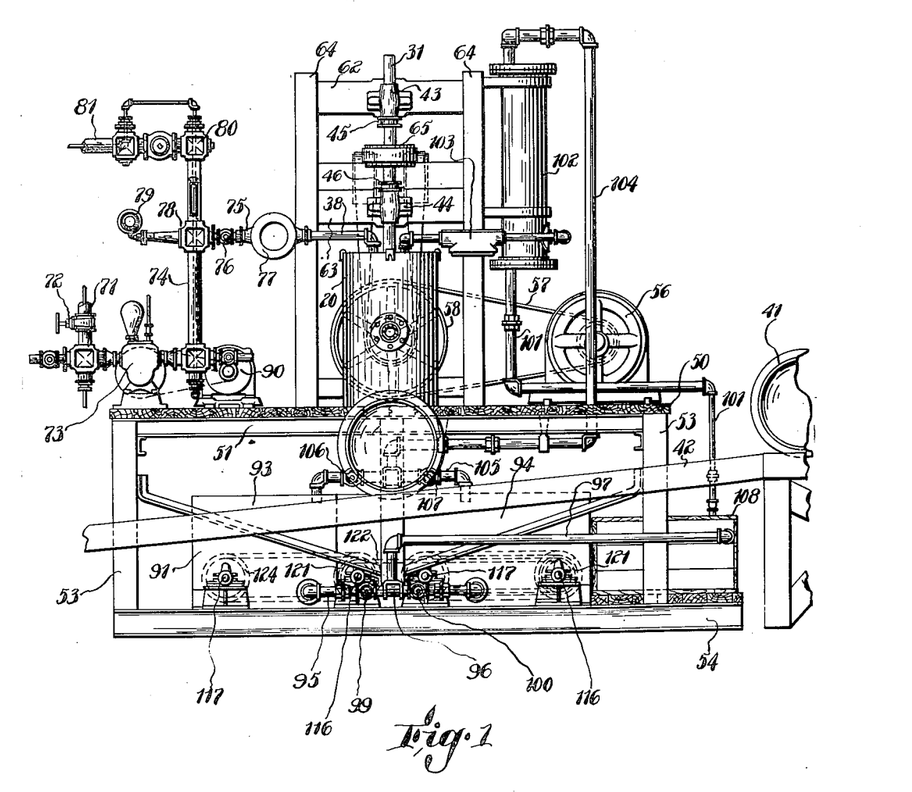
Figure 6:
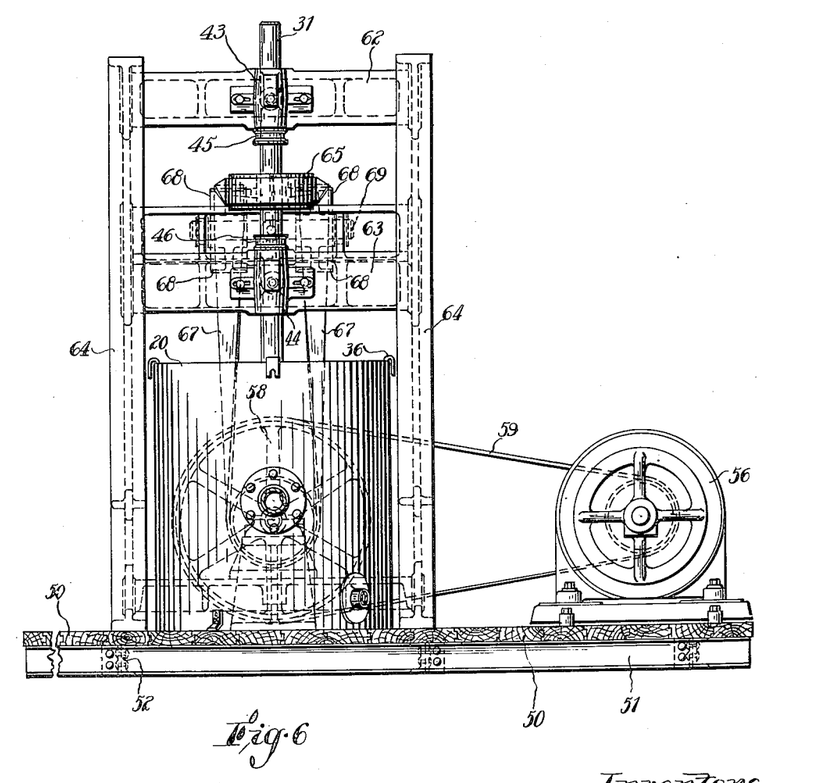
Figure 6 represents in front elevation the upper part of the apparatus including the tank for the tool and the mixer on a larger scale.
Figure 7:
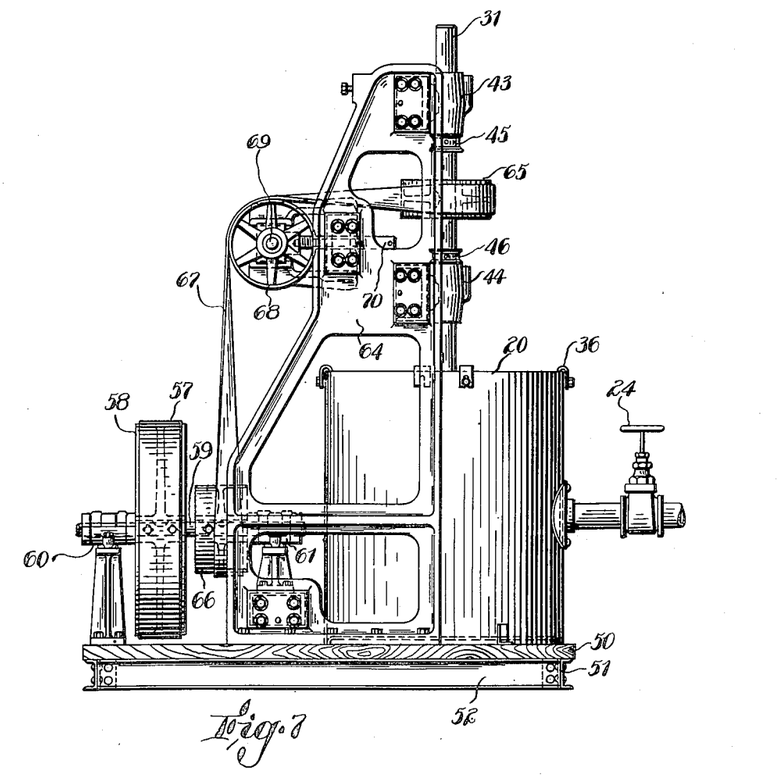
Figure 7 represents a side elevation of the same.
Figure 8:
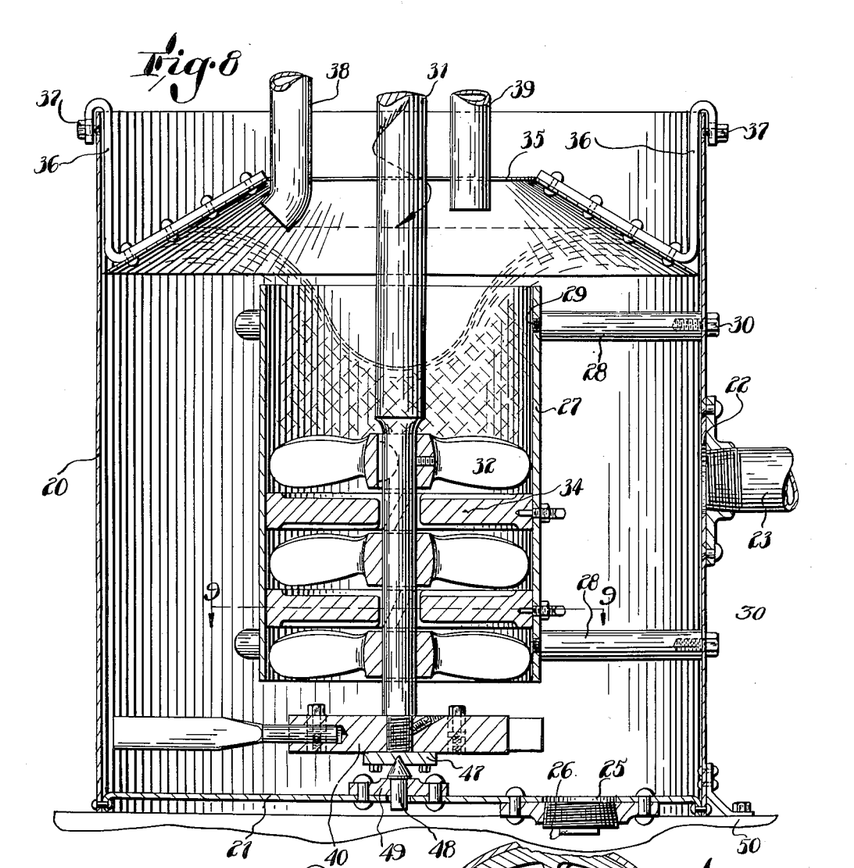
Figure 8 represents, in section and on a still larger scale, the mixer, and the container or tank for the pool and in which the mixer is enclosed.
Figures 9, 10:
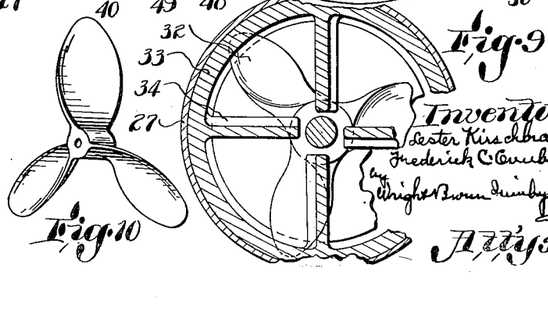
Figure 9 illustrates one of the bladed baffle rings in the mixer.
Figure 10 illustrates one of the agitators employed in the mixer.
Figure 11:
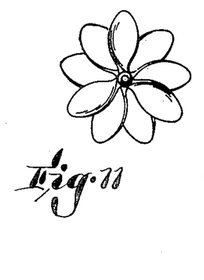
Figure 11 illustrates the relation of the several agitators on the mixer shaft.

The agitator shaft 31, as shown in Figures 1, 6 and 7, has its upper portion journaled in adjustable bearings 43, 44, and is provided with adjustable thrust collars 45, 46, so that it may be adjusted vertically and laterally to align its axis with the axis of the mixed cylinder. At its lower end, the shaft 31 is threaded (as shown in Figure 8) to receive the hub 40, to which is secured an end thrust plate 47 engaging the conical end of pin 48. The pin 48 is located in a plate 49 riveted to the bottom of the tank or container 20.

The tank 20 is supported on a platform 50, placed upon an upper horizontal frame consisting of I-beams 51, connected by cross-beams 52, and resting on beams 501 secured to uprights or legs 53. The uprights rest upon and are secured to a lower frame including the longitudinal and transverse beams 54, 55. Upon the platform 50, we have shown an electric motor 56 from the rotor shaft of which a belt 57 transmits power to a pulley 58 on a transverse shaft 59 journaled in bearings 60, 61. From this shaft power is transmitted to the mixer shaft 31, as will be described. The bearings 43, 44 for said mixer shaft are supported by cross bars 62, 63, affixed to side standards 64, 64, of any suitable construction secured upon the platform 50. Shaft 31 has a pulley 65, to which power is transmitted from a pulley 66 on shaft 59, by a belt 67 which passes over pulleys 68, 68, loose on a horizontal shaft 69. The last-mentioned shaft is mounted in adjustable boxes or bearings which may be adjusted by a screw bar 70 to vary the tension on the belt 67. In lieu of employing an electric motor, and the special power-transmitting mechanism which has been described, power for effecting a rapid rotation of the mixer shaft may be derived from any other suitable source and transmitted to the shaft by any other suitable power-transmitting mechanism.

The asphalt, pitch or other hydrocarbon or bitumen is drawn from the usual kettles (not shown) in which it is heated to the desired temperature, and is delivered to the conduit 38 by which it is supplied to the mixer. In order that it may be prevented from freezing, the various conduits through which it passes are steam-jacketed or have internal steam pipes as may be most convenient. The asphalt comes from the kettle through conduit 71, valved as at 72, and is forced by a suitable pump 73 (preferably of the Kinney type) to an upright conduit 74 from which a branch 75, valved as at 76, leads to a meter 77 (preferably of the Bowser type) to the outlet of which the conduit 38 is connected. Connected to the fitting 78, from which the branch 75 extends is a pressure gage 79. The asphalt is thus continuously pumped to the mixer, and is metered so that the operator is able to determine the volume being delivered. The rate of flow may be graduated by the valve 76. At the upper end of the upright conduit 74, there is a fitting 80 from which a conduit 81 leads back to the kettle. A constant circulation of asphalt is maintained through the kettle, the pipe 81, pump 73, pipe 74, and pipe 81 to prevent the asphalt from freezing. The pump 73 is shown as being operated by an electric motor 90, and both the pump and the motor as being supported upon the platform 50.

The instrumentalities for creating the colloid suspension and for feeding it to the mixer will now be described. A large tank 91 is supported on the lower frame beneath the platform 50, and is divided transversely by a partition 92 to form two separate compartments 93, 94, so that one batch may be undergoing the mixing operation in one, while the already prepared batch in the other is being withdrawn for delivery to the emulsionizer. In front of the duplex tank, there is a pipe 95 having its opposite ends opening into two compartments to receive the colloid suspension therefrom, and between its ends it has a T-fitting 96 from which a pipe 97 leads to a pump 98. The pipe 95 has the two valves 99, 100, to cut off the supply from the two suspension-forming or mixing compartments. By the pump, the suspension delivered thereto is forced through a pipe 101, to the bottom of an upright tank or standpipe 102 secured to one of the standards 64 above the level of the emulsionizing tank. From the lower portion of this tank or standpipe 102, the pipe 37 delivers the suspension to the emulsionizer or mixer. Inserted between sections of the pipe 37, there is a meter 103 of any suitable character for measuring the flow of the suspension. By the provision of the elevated standpipe, the hydrostatic pressure or head is unvarying, provision being made however to keep the standpipe full at all times. To this end, an overflow pipe 104 leads from the closed upper end of the standpipe to a manifold 105 whose ends are downturned into the two compartments of tank 91, and are provided with valves 106, 107. The pump 98 is continuously driven at such speed as to ensure a greater quantity of suspension being fed to the standpipe than will flow, under the constant hydrostatic head, to the emulsionizer. By thus circulating the suspension, we prevent the colloidal material from settling in the standpipe. The rate of flow of the suspension into the emulsionizer is thus constant, and the rate of flow of the asphalt may be varied, according to the meter readings, to secure the desired proportion of asphalt to suspension. The pump 98 is preferably contained within a closed box or casing 108, and is operated by a motor 109 likewise located in said casing. The rotor shaft is shown as having a pulley 110, which by a belt 111 drives an operating pulley 112 on the pump. This motor likewise drives the agitators or stirrers in the suspension-forming compartments, and for that purpose its rotor shaft is provided with a worm 113 meshing with a worm wheel 114 on a shaft 115 journaled in suitable bearings. The manner in which the shaft 115 imparts power to the agitators or stirrers will be subsequently described. There is a separate stirring or agitating instrumentality in each of the two compartments 93, 94, in the tank 91, and any suitable form thereof may be employed. As shown, there are passed through stuffing boxes in the front and rear walls of each compartment two shafts 116, 117, journaled in suitable bearings. One of the shafts 116 has a pulley or sprocket wheel 118, to which power is transmitted from a pulley or sprocket 119 on shaft 115 by a belt or sprocket chain 120. Said shaft 116 is connected to the other shaft 116 by pulleys or sprockets 121, 121, and belt or chain 122, in consequence of which said shafts 116 are constantly rotated. Within the two compartments, each pair of shafts 116, 117, operates an endless slat conveyer consisting of sprocket chains carrying transverse slats 123 and tracking on sprockets 124 on said shafts. One stretch of each conveyer travels horizontally close to the bottom of the compartment, and the other along a level thereabove so that the slats in their travel adequately stir, agitate and mix the water and colloidal material which are supplied to the compartment, to produce a substantially homogeneous suspension of water and clay or other colloid. The clay is supplied by any suitable instrumentalities to the several compartments, as by measuring scoops or buckets, in the hands of the workmen, and the water is supplied from a suitable source through a pipe 125 having a manifold 126, provided with valves or faucets 127 located above the compartments.

The proportions of clay to water are preferably, by weight, one to four, but these, of course, may be varied. In consistency the suspension is not unlike milk of lime.

Assuming that the emulsionizing tank is empty, in order to start the process, the procedure may be as follows. A thick pasty or plastic mass of clay and water is secured by filling the emulsionizing tank with water, starting the mixer shaft in operation, and adding clay gradually, until the mixture is like mud and is barely capable of flowing. There it is heated by a steam coil (not shown) introduced around the cylinder until it reaches a temperature of about 130° F. Asphalt (140°–220° F., M. P.) heated to a temperature of 325°–400° F. to cause it to flow readily is added in a thin stream to the mass, water at ordinary temperature also being added. The cooling of the asphalt by the water tends to make the mixture stiffen or become more viscous. The level of the mixture is maintained just above the upper end of the cylinder, asphalt and water being added, and the agitation continued until the proportions of clay, water and asphalt are approximately correct and the desired consistency of the emulsion is obtained. Then the supply of water is cut off, the pump 98 is started in action, and the suspension from one of the compartments of the tank 91 is delivered continuously to the emulsifying instrumentality. Thereafter the suspension and the asphalt are fed continuously and at the desired relative rates of flow.

We believe that it is advantageous to maintain the temperature of the hydrocarbon or bitumen above the boiling point of water, as doubtless the generation of steam causes the formation of bubbles and consequently of thin films of the asphalt. The steam, if any, however is subsequently condensed in the mass, the temperature of which is below the boiling point of water. The asphalt is drawn out into attenuated threads, which break, this action being rapid and repeated, until the filaments become so small, and are so subdivided, that the surface tension of the particles causes them to assume a globular form. The presence of the finished product, which is more viscous than the molten aphalt, assists in the formation of the attenuated threads or filaments and their subdivision into discrete particles. This dispersion of the asphaltic material is produced also with the aid of the emulsionizing agent (i. e. the colloidal material), which in effect either increases the surface tension of the molten pitch undergoing dispersion, or decreases that of the dispersion medium. It is essential that the molten asphaltic material should not come as a stream into contact with the agitator blades or paddles so as to adhere thereto, and form lumps of undispersed hard material, and hence a thin stream of the asphalt is preferably delivered upon the swirling stream of finished or base product which is overflowing the upper edge of the cylinder and brought thereby into contact with the aqueous suspension which is also delivered thereon. The asphaltic material, the aqueous suspension, and a small portion of the virgin or finished product, which are being subjected at their point of confluence to the action thus described, are separated from the upwardly moving mass in the tank, by the central open end cylinder, the churning operation of the agitating propellers taking place within the cylinder. Ordinarily the proportion of asphalt and clay is about four or five parts by weight of asphalt to one part of clay, but these proportions may be greatly varied. An emulsion produced as herein described may contain, for example, 50% asphalt, 10% clay and 40% water, by weight. Such an emulsion, in which the asphalt is dispersed in the water, may be thinned with water, and mixed with the proper stock in an ordinary beater and formed into a fitted sheet. When the water is eliminated from the sheet the particles of asphalt coalesce, and the sheet is in many respects like a felt sheet which has been impregnated with molten aphalt and then permitted to cool. The emulsion is non-adhesive, but with the elimination of water becomes a coherent coalescent mass.

In the following claims the term bitumen must be construed to include all materials disclosed and described in the beginning of the second paragraph of this specification.

Having thus explained the nature of our said invention, and described a way of making and using the same, although without attempting to set forth all of the forms in which it may be made or all of the modes of its use, what we claim is:—

1. The herein described process, which consists in circulating an emulsified body of bitumen, colloid and water through a confined space, feeding into said space streams of an aqueous colloidal suspension and a bitumen, and rapidly agitating the mass in said confined space.

2. The herein described process, which consists in continuously feeding separate streams of an aqueous colloidal suspension, and a bitumen which is heated beyond the boiling point of water, through a confined space, and agitating the same within said space.

3. The herein described process, which consists in continuously circulating an emulsified body of water, colloid and bitumen through a confined space, agitating such body in said space during its circulation, and continuously feeding to such body while undergoing agitation separate streams of an aqueous colloidal suspension and of a molten bitumen to produce an emulsion thereof.

4. The herein described process, which consists in circulating an aqueous bituminous emulsion through a confined space, causing the addition thereto of separate continuous streams of an aqueous colloidal suspension and a molten bitumen, the latter at a temperature of or above 212° F., to the confined space, and rapidly agitating the mass within said space, thereby producing an emulsion.

5. The herein described process, which consists in causing the delivery of separate continuous streams of an aqueous colloidal suspension and a molten bitumen into a chamber open at both ends to cause a mixture thereof, causing a portion of the mixture to flow back into said chamber, and agitating said mass within and forcing it through said chamber, thereby producing an emulsion.

6. The herein described process, which consists in causing the delivery of separate continuous streams of an aqueous colloidal suspension and a molten bitumen at a temperature of or above 212° F. to a chamber open at both ends, agitating said mass within and forcing it through said chamber, and recirculating the emulsion thereby formed through and agitating it in said chamber in contact with the streams of suspension and bitumen.

7. The herein described process, which consists in causing the delivery into an open end chamber of streams of aqueous colloidal suspension and heated bitumen in predetermined proportions, agitating said mass within and recirculating it through said chamber, and continuously withdrawing a portion of thereby emulsified end product.

8. The herein described process, which consists in establishing a pool of an emulsion of water, colloid and bitumen, circulating such emulsion from such pool through an open end chamber immersed in said pool, continuously supplying such open end chamber with streams of an aqueous colloidal suspension and a molten bitumen, agitating the mass within said chamber, and continuously withdrawing a portion of the product from said pool at substantially the same rate at which said suspension and bitumen are supplied.

9. A process of continuously producing an emulsion which consists in circulating an emulsified body of bitumen, colloid and water through a confined space, feeding into said space regulated quantities of water, colloid agent and a bitumen, and rapidly agitating the mass in said confined space.

10. The herein described process, which consists in continuously feeding regulated streams of water colloidal emulsifying agent and a bitumen in heated liquid condition through a confined space, and agitating the same within said space to produce an emulsion.

11. The herein described process, which consists in circulating a body of aqueous bituminous emulsion through a confined space, causing the addition thereto of regulated quantities of water, colloid, and molten bitumen at a temperature of or above 212 degrees F., while maintaining the circulating body of bituminous emulsion at a temperature below 212 degrees F. and rapidly agitating the mass within said confined space to produce an emulsion.

12. A process of continuously forming an emulsion, consisting in causing the delivery into an open end chamber of an argillaceous emulsifying agent containing colloidal particles, water and heated bitumens in predetermined proportions, agitating said mass within and circulating it through said chamber and continuously withdrawing a portion of thereby emulsified end product.

13. The herein described process, which consists in continuously feeding regulated streams of water, colloidal clay as an emulsifying agent and a bitumen in heated liquid condition, through a confined space, agitating the same within said space to produce an emulsion.

14. A process comprising introducing fluid bituminous material into a bath of moving liquid ordinarily immiscible therewith so as to be immediately propelled by the moving liquid into the zone where the liquid is moving at an accelerated velocity.

15. A process comprising introducing a herein described heat liquefiable substance in a fluid state into a bath of moving liquid ordinarily immiscible therewith in the immediate vicinity of the zone where the bath of liquid is moving at an accelerated velocity, adjusting and maintaining the temperature of the bath to admit of high degrees of attenuation and dispersion before the substantial solidification of said liquefiable substance.

16. A process comprising introducing fluid bituminous material into a bath of moving liquid ordinarily immiscible therewith at such zone where the liquid is moving at an accelerated velocity, adjusting and maintaining the difference in temperature between the bath and the incoming fluid bitumen to admit of high degrees of attenuation and dispersion before the substantial solidification of said bitumen.

17. A process comprising introducing fluid asphalt into a moving, aqueous bath at such zone where the water is moving at an accelerated velocity, adjusting and maintaining the difference in temperature between the bath and the incoming fluid asphalt to admit of high degrees of attenuation and dispersion before the substantial solidification of said asphalt.

18. A process comprising introducing fluid bituminous material into a bath of rotating liquid ordinarily immiscible therewith in the immediate vicinity of the zone where the liquid is moving at an accelerated velocity, adjusting and maintaining the difference in temperature between the bath and the incoming fluid bitumen to admit of high degrees of attenuation and dispersion before the substantial solidification of said bitumen.

19. A process comprising introducing fluid bituminous material into a bath of moving liquid ordinarily immiscible therewith in the immediate vicinity of the zone where the liquid is moving at an accelerated velocity, adjusting and maintainining the temperature of the bath and regulating the motion of the bath to admit of high degrees of attenuation and dispersion before the substantial solidification of said bitumen.

20. A process comprising introducing a liquefiable substance in a fluid state into a cooler bath of a liquid ordinarily immiscible therewith, subjecting said fluid substance to the immediate action of attenuating forces comprising a powerful drawing action by said liquid and dissociating said fluid substance into globules approaching colloidal size and non-coalescent with each other in said liquid.

21. A process comprising introducing a liquefiable substance in a fluid state into a bath of moving liquid ordinarily immiscible therewith in the immediate vicinity of the zone where the liquid is moving at an accelerated velocity, said bath of liquid being subjected to a compound motion resulting in all of the liquid undergoing, at very short intervals, the varying linear velocities in the various parts of the bath.

22. A process comprising introducing fluid bituminous material into a moving, aqueous bath in the immediate vicinity of the zone where the water is moving at an accelerated velocity, said aqueous bath being subjected to a compound motion resulting in all of the water undergoing, at very short intervals, the varying linear velocities in the various parts of the bath.

23. In a process of dispersing bituminous material in a liquid ordinarily immiscible therewith, introducing bituminous material in a fluid state into a bath of said liquid, establishing a transition period by adjusting the temperature of the bath to that of the incoming bituminous fluid during which period said bituminous fluid is cooled from its incoming temperature to that of the bath, imparting motion to the bath of said liquid and subjecting said bituminous fluid during the transition period to an attenuating force comprising a drawing action by the moving liquid bath.

24. In a process of dispersing bituminous material in a liquid ordinarily immiscible therewith, introducing bituminous material in a fluid state into a bath of said liquid, establishing a transition period by adjusting the temperature of the bath to that of the incoming bituminous fluid during which period said bituminous fluid is cooled from its incoming temperature to that of the bath, imparting motion to the bath of said liquid by means adjusted within said bath and operating at sufficient velocity to draw during the transition period all of the bituminous fluid introduced into the bath into the sphere of attenuation and dispersion.

25. In a process of dispersing bituminous material in a liquid ordinarily immiscible therewith, introducing the bituminous material into a bath of said liquid, maintaining the bath at temperatures where the bituminous material introduced therein will have fluidity admitting of high degree of attenuation when subjected to a force operating to attenuate said bituminous material, imparting accelerating motion to the bath of said liquid and subjecting said bituminous material to an attenuating force comprising a drawing action by the moving liquid bath.

26. In a process of dispersing bituminous material in a liquid ordinarily immiscible therewith, the steps which include subjecting the bituminous material in a fluid state to high, increasing tension and accelerated motion in the presence of said liquid.

27. In a process of dispersing a liquefiable substance in a liquid ordinarily immiscible therewith, the steps which include subjecting said substance in a fluid state to high increasing tension and motion having increasing acceleration in the presence of said liquid.

28. In a process of dispersing a liquefiable substance in a liquid ordinarily immiscible therewith, the steps which include subjecting said substance in a fluid state to high, increasing tension and motion having increasing acceleration by the action of said liquid moving with a velocity having increasing acceleration.

29. In a process of dispersing a herein described heat liquefiable substance in a liquid ordinarily immiscible therewith, the steps which include subjecting said substance in a fluid state to tension and accelerated motion in the presence of said liquid.

30. In a process of dispersing a herein described heat liquefiable substance in a liquid ordinarily immiscible therewith, the steps which include subjecting said substance in a fluid state and in the presence of said liquid to tension, accelerated motion and progressive severing of its constituent particles.

31. In a process of dispersing a herein described heat liquefiable substance in a liquid ordinarily immiscible therewith, the steps which include subjecting said substance in a fluid state to high tension and progressive severing of its constituent particles into minute, non-coalescing globules by the action of said liquid moving with an accelerated velocity.

32. In a process of dispersing bituminous material in water, the steps which include subjecting said bituminous material in a fluid state to accelerated motion and high tension by the action of water moving with accelerated linear velocity.

33. In a process of dispersing bituminous material in water, the steps which include subjecting said bituminous material in a fluid state and in the presence of the water to tension, accelerated motion and progressive severing of its constitutent particles.

34. In a process of dispersing bituminous material in a liquid ordinarily immiscible therewith, the steps which include subjecting said bituminous material in a fluid state to high tension and progressively severing of its constituent particles into minute non-coalescing globules by the action of said liquid moving with an accelerated velocity.

35. In a process of dispersing asphalt in water, the steps which include subjecting the asphalt in a fluid state to high tension and progressive severing of its constituent particles into minute, non-coalescing globules by the action of the water moving with an accelerated velocity.

36. In a process of dispersing bituminous material in a liquid ordinarily immiscible therewith, introducing the bituminous material into a bath of said liquid, maintaining the bath at temperatures where the bituminous material introduced therein will have fluidity admitting of high degree of attenuation when subjected to a force operating to attenuate said bituminous material and subjecting said bituminous material to the attenuating force.

37. In a process of dispersing bituminous material in water, introducing the bituminous material into a bath of water, maintaining the bath at temperatures where the bituminous material introduced therein will have fluidity admitting of high degree of attenuation when subjected to a force operating to attenuate said bituminous material and subjecting said bituminous material to the joint action of the attenuating force and a force operating to dissociate the attenuated bituminous material into fine particles.

38. In a process of dispersing bituminous material in a liquid ordinarily immiscible therewith, introducing the bituminous material into a bath of said liquid, maintaining the bath at temperatures and viscosity where the bituminous material introduced therein will have fluidity admitting of high degree of attenuation when subjected to a force operating to attenuate said bituminous material and subjecting said bituminous material to the attenuating force.

39. In a process of dispersing bituminous material in a liquid ordinarily immiscible therewith, introducing the bituminous material into a bath of said liquid, maintaining the bath at temperatures where the bituminous material introduced therein will have fluidity admitting of high degree of attenuation when subjected to a force operating to attenuate said bituminous material and subjecting the bath to a motion operating to bring the bituminous material introduced therein under the action of the attenuating force.

40. In a process of dispersing bituminous material in a liquid ordinarily immiscible therewith, introducing the bituminous material into a bath of said liquid, maintaining the bath at temperatures where the bituminous material introduced therein will have fluidity admitting of high degree of attenuation when subjected to a force operating to attenuate said bituminous material, imparting motion to the bath of said liquid and subjecting said bituminous material to an attenuating force comprising a drawing action by the moving liquid bath.

41. In a process of dispersing a herein described heat liquefiable substance in a liquid ordinarily immiscible therewith, containing an emulsifying agent, the steps which include subjecting said substance in a fluid state to tension and accelerated motion in the presence of said liquid and said emulsifying agent.

42. In a process of dispersing bituminous material in a liquid ordinarily immiscible therewith and containing an emulsifying agent, introducing the bituminous material into a bath of said liquid, maintaining the bath at temperatures and viscosity where the bituminous material introduced therein will have fluidity admitting of high degree of attenuation when subjected to a force operating to attenuate said bituminous material and subjecting said bituminous material to the attenuating force.

43. In a process of continuously dispersing a herein described heat liquefiable substance in a liquid ordinarily immiscible therewith, the steps which include continuously introducing said substance in a fluid state, subjecting the same to tension and accelerated motion in the presence of said liquid and continuously withdrawing dispersed material from said liquid mass.

44. A process comprising continuously introducing a liquefiable substance in a fluid state in a cooler bath of a liquid ordinarily immiscible therewith, subjecting said fluid substance to the immediate action of attenuating forces, comprising a powerful drawing action by said liquid and dissociating said fluid substance into globules approaching colloidal size and non-coalescent with each other in said liquid, and continuously withdrawing the dispersion from said liquid mass.

45. A process which comprises introducing a bituminous substance in a fluid state into a cooler viscous bath of a liquid ordinarily immiscible therewith and containing a paste forming colloid, subjecting said bituminous substance to the action of attenuating forces comprising a drawing action of the bath under the influence of agitating action whereby to break up said bituminous substance into discrete particles.

46. A process which comprises introducing bituminous material in a fluid state into a bath of viscous liquid ordinarily immiscible therewith, maintaining said bath at a temperature and viscosity to promote repeated attenuation of the bituminous material under the forces of internal friction established by movement of the bath under agitation and subjecting the mass to agitating action to form the bituminous material into discrete particles.

In testimony whereof we have affixed our signatures.

LESTER KIRSCHBRAUN.
FREDERICK C. OVERBURY.